United States Patent
Beveridge et al.

(10) Patent No.: US 9,542,080 B2
(45) Date of Patent: Jan. 10, 2017

(54) USER INTERFACE VIRTUALIZATION OF CONTEXT MENUS

(71) Applicant: VMware, Inc., Palo Alto, CA (US)

(72) Inventors: Daniel James Beveridge, Apollo Beach, FL (US); Ming Zhao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 393 days.

(21) Appl. No.: 13/975,093

(22) Filed: Aug. 23, 2013

(65) Prior Publication Data

US 2014/0013234 A1 Jan. 9, 2014

Related U.S. Application Data

(63) Continuation-in-part of application No. 13/658,291, filed on Oct. 23, 2012.
(Continued)

(51) Int. Cl.
| | |
|---|---|
| G06F 3/048 | (2013.01) |
| G06F 3/0484 | (2013.01) |
| G06F 3/0488 | (2013.01) |
| G06F 3/14 | (2006.01) |
| G06F 3/0482 | (2013.01) |
| G06F 9/44 | (2006.01) |

(52) U.S. Cl.
CPC .......... *G06F 3/0484* (2013.01); *G06F 3/0482* (2013.01); *G06F 3/0488* (2013.01); *G06F 3/14* (2013.01); *G06F 9/4445* (2013.01); *G09G 2354/00* (2013.01); *G09G 2370/022* (2013.01); *G09G 2370/16* (2013.01); *G09G 2380/14* (2013.01)

(58) Field of Classification Search
CPC .... G06F 3/0484; G06F 3/0482; G06F 3/0488; G06F 3/14; G06F 9/4445

USPC .......................................................... 715/740
See application file for complete search history.

(56) References Cited

U.S. PATENT DOCUMENTS

| | | | |
|---|---|---|---|
| 6,725,238 B1 | 4/2004 | Auvenshine | |
| 6,920,480 B2 | 7/2005 | Mitchell et al. | |
| (Continued) | | | |

FOREIGN PATENT DOCUMENTS

| | | |
|---|---|---|
| JP | 2005-506595 A | 3/2005 |
| JP | 2010-226737 A | 10/2010 |
| JP | 2012-079084 A | 4/2012 |

OTHER PUBLICATIONS

Extended European Search Report, dated Jul. 22, 2013, Application No. EP 13164249.8 7 pages.
(Continued)

*Primary Examiner* — David Phantana Angkool
(74) *Attorney, Agent, or Firm* — Patterson & Sheridan LLP

(57) ABSTRACT

User interface virtualization describes a technique for providing a user with access to one computing device from another computing device, while translating the ergonomics of one computer's user interface style into the ergonomics of the other's. An agent running on a remote desktop may use an interface interaction API or software framework to programmatically open and manipulate a context menu on the remote desktop, and act as a proxy for a corresponding client running on a client device that accepts a "touch and swipe" style input. The client constructs and displays a native graphical user interface element at the client device that is a virtual representation of the context menu at the remote desktop.

20 Claims, 9 Drawing Sheets

Related U.S. Application Data

(60) Provisional application No. 61/638,469, filed on Apr. 25, 2012.

(56) References Cited

U.S. PATENT DOCUMENTS

| | | | |
|---|---|---|---|
| 7,275,212 B2 | 9/2007 | Leichtling | |
| 7,418,472 B2 | 8/2008 | Shoemaker et al. | |
| 7,676,549 B2 | 3/2010 | McKeon et al. | |
| 8,271,675 B2* | 9/2012 | Oh | G06F 3/0482 709/203 |
| 8,539,039 B2* | 9/2013 | Sheu | G06F 9/4445 709/202 |
| 8,650,494 B1 | 2/2014 | Sampath et al. | |
| 8,738,814 B1* | 5/2014 | Cronin | G06F 3/04883 710/15 |
| 9,055,139 B1* | 6/2015 | Devireddy | H04L 67/2809 |
| 9,176,751 B2* | 11/2015 | Colelli | G06F 9/445 |
| 9,195,636 B2* | 11/2015 | Smith | G06F 17/212 |
| 9,197,718 B2* | 11/2015 | Kiang | H04L 67/327 |
| 9,213,684 B2* | 12/2015 | Lai | G06F 17/2247 |
| 9,292,833 B2* | 3/2016 | Savage | H04L 12/2417 |
| 9,311,071 B2* | 4/2016 | Tan | G06F 8/65 |
| 2002/0111995 A1 | 8/2002 | Mansour et al. | |
| 2008/0120393 A1 | 5/2008 | Chen et al. | |
| 2008/0255852 A1 | 10/2008 | Hu | |
| 2010/0082733 A1 | 4/2010 | Bernstein et al. | |
| 2010/0269046 A1 | 10/2010 | Pahlavan et al. | |
| 2010/0269047 A1 | 10/2010 | Pahlavan et al. | |
| 2010/0269152 A1 | 10/2010 | Pahlavan et al. | |
| 2011/0138295 A1 | 6/2011 | Momchilov et al. | |
| 2011/0246904 A1 | 10/2011 | Pinto et al. | |
| 2011/0314093 A1 | 12/2011 | Sheu et al. | |
| 2012/0042271 A1 | 2/2012 | Ma et al. | |
| 2012/0159310 A1 | 6/2012 | Chang et al. | |
| 2012/0226985 A1 | 9/2012 | Chervets et al. | |
| 2012/0311457 A1* | 12/2012 | O'Gorman | G06F 3/048 715/740 |
| 2013/0055102 A1 | 2/2013 | Matthews et al. | |
| 2013/0132856 A1 | 5/2013 | Binyamin et al. | |
| 2013/0246932 A1 | 9/2013 | Zaveri et al. | |
| 2013/0290856 A1 | 10/2013 | Beveridge et al. | |
| 2013/0290857 A1 | 10/2013 | Beveridge | |
| 2014/0013234 A1 | 1/2014 | Beveridge et al. | |
| 2014/0082512 A1 | 3/2014 | Neuert et al. | |
| 2014/0096014 A1 | 4/2014 | Johnson et al. | |

OTHER PUBLICATIONS

Cheng-Li Tsao: "SmartVNC: SmartVNC: An Effective Remote Computing Solution for Smartphones", Sep. 23, 2011 (Sep. 23, 2011), pp. 13-24, XP055070896, ACM, [retrieved from the Internet Jul. 11, 2013].
Australian Office Action Patent Application No. 2013204723 dated Nov. 12, 2014, 3 pages.
Nao Toyama, "JAVAScript + blowser explore",WEB+DB Press, Japan, Gijutsu-Hyohron Co., Ltd., Mar. 25, 2009, First Edition, vol. 49, pp. 160-167.
Kazuhiro Fukuda, "Make the strongest Linux machine with simple and low cost", Nikkei Linux, Japan, Nikkei Business Publications, Aug. 8, 2012, No. 14, vol. 9, pp. 54-60.
Japanese Office Action Dated Feb. 9, 2016 in counterpart Japanese Patent Application U.S. Appl. No. 2013-091433.

* cited by examiner

USER INTERFACE VIRTUALIZATION OF CONTEXT MENUS

CROSS-REFERENCE TO RELATED APPLICATIONS(S)

This application is a continuation-in-part of co-pending U.S. patent application Ser. No. 13/658,291 filed Oct. 23, 2012 and entitled "User Interface Virtualization Techniques", which claims the benefit of U.S. provisional patent application Ser. No. 61/638,469, filed Apr. 25, 2012. Each of the aforementioned related patent applications is herein incorporated by reference.

This application is related to U.S. patent application Ser. No. 13/646,993, filed Oct. 8, 2012, and entitled "User Interface Virtualization for Mobile Devices", the entire contents of which are incorporated by reference herein. This application is also related to U.S. patent application Ser. No. 13/778,495, filed Feb. 27, 2013 and entitled "User Interface Virtualization Profiles for Accessing Applications on Remote Devices", the entire contents of which are incorporated by reference herein.

BACKGROUND

Server-based computing allows a networked client device, remotely situated with respect to a server computing system, to access computing resources on the server. For example, the client device may run desktop remoting client software and hardware that uses a remote desktop protocol, such as Remote Desktop Protocol (RDP), Virtual Network Computing (VNC), or Personal Computer over Internet Protocol (PCoIP), to access a desktop remotely. The desktop remoting client software displays an image of a graphical user interface generated by the operating system and applications running at the server computing system, e.g., in a virtual machine. The term "desktop" can refer to a virtual machine or physical system accessed by an end user as a local (to the user) desktop or workstation computer. The term "desktop" may also refer to the human interface environment through which users can launch, interact with, and manage applications, settings, and data. The remote desktop is accessible by the user using the remote desktop protocol and a desktop remoting client. The client device typically has a local set of input and output devices (e.g., display, keyboard, mouse) and transmits user input such as keyboard or mouse input to the remote system to be processed there and receives display and other data (e.g., sound) for presentation to the user using the local set of I/O devices.

However, users of client devices with touch-screens face several challenges when interfacing with traditional desktop-based applications (e.g., Microsoft Windows® applications) and desktops through a remote display protocol. One challenge relates to latency of the network connection between the touch-screen device and the remote desktop, which often creates a halting or jittery user experience. Another challenge relates to attempts to remotely control a conventional "point-and-click" driven interface (e.g., Windows® interface) from a touch-screen device which is designed not for traditional "point-and-click" interactions, but rather, for touch-screen gestures and "finger swipe" style of interactions.

To address these challenges, it is known in the art to modify a remote desktop controlled by touch screen devices, for example, by automatically adjusting a font size of the remote desktop. However, these largely cosmetic changes only modify the displayed contents received from the remote server, do not fail to reduce latency in menu navigation and user feedback, and still require users to navigate desktop applications through a "point-and-click" style interface.

It is also known in the art, as described in "Remote Desktop Protocol: Graphics Device Interface Acceleration Extensions" made available by Microsoft Inc., for a remote server to use its own video driver to render display output and encoding drawing operations that produce an image instead of encoding the actual image. For example, instead of sending a bitmap image of a filled rectangle from server to client, an order to render a rectangle at coordinate (X,Y) with given width, height, and fill color may be sent to the client. The client then executes the drawing order to produce the intended graphics result. However, this approach only produces a same corresponding graphical interface on the client as on the server, which are difficult to use on a client device having a touch-screen or non-pointer based style of interface.

Alternatively, it is also known in the art, as described in United States Patent Publication No. 2011/0314093 A1, to translate user gestures on a client device into a digital representation of a remote computer's native input format, such as a control common to a two-button mouse (e.g., click, window scroll, right click), thereby allowing the client device to control the computer. However, this approach forces a user to learn a new user interface and memorize which touch screen gestures is equivalent to a mouse input, which can be cumbersome and hard to use. Further, this approach still requires capturing and displaying basic screen data from the remote desktop and does not improve latency in interactions between the user and the user interface.

Consequently, there is a need for improved systems and methods for providing access to a remote desktop having one style of user interface to a client device having a different style of user interface.

SUMMARY

One or more embodiments of the present disclosure provide a method of generating a local graphical user interface (GUI) on a touch screen of a client device that is connected to a server device having a remote desktop. The method includes receiving, from the server device, user interface (UI) metadata that specifies content of a context menu in the remote desktop, and a base image comprising a graphical representation of the remote desktop. The method further includes generating, at the client device, a native context menu GUI element based on received UI metadata. The native context menu GUI element includes a virtual representation corresponding to the context menu of the remote desktop. The method further includes generating a local GUI to be displayed on the touch screen of the client device. The local GUI includes the base image received from the server device and the native context menu GUI element. The method includes, responsive to detecting that the native context menu GUI element has been manipulated through a touch input, transmitting, to the server device, an input event indicating a manipulation of the corresponding context menu in the remote desktop.

Another embodiment of the present disclosure provides a method of providing access to a remote desktop of a server device having a guest operating system executing therein. The method includes generating user interface (UI) metadata specifying a context menu in a graphical user interface (GUI) of a remote desktop using an application programming interface of the guest operating system configured to programmatically manipulate the GUI of the server device.

The method further includes transmitting a base image of the GUI and the generated UI metadata to a touch input client device connected to the server device, and receiving, from the touch input client device, an input event indicating menu navigation of the context menu in the GUI of the remote desktop. The method includes programmatically manipulating the context menu in the GUI of the remote desktop according to the received input event using the application programming interface of the guest operating system.

Further embodiments of the present disclosure include a non-transitory computer-readable storage medium that includes instructions that enable a processing unit to implement one or more of the methods set forth above or the functions of the computer system set forth above.

DETAILED DESCRIPTION

Embodiments of the disclosure provide a technique and system for user interactions on a client system with one user interface scheme (e.g., touch screen) to remotely operate a server system with another user interface scheme (e.g., "point-and-click" desktop). In one embodiment, a virtual desktop infrastructure (VDI) uses an application programming interface (API) configured to programmatically manipulate and activate graphical user interface (GUI) elements of the server-side desktop to bridge the difference in user interface schemes between the touch screen client system (e.g., tablet computer, smart phone) and server-side desktop.

For example, application frameworks and Application Programming Interfaces (APIs), such as Microsoft Active Accessibility (MSAA) API and Microsoft UI Automation (UTA) API, may derive contents of UI elements, such as menu navigation, at the server-side desktop which are then passed to the remote client system (e.g., tablet computer) over a network connection (e.g., via desktop remoting protocols). The menu contents are rendered as a native GUI element and engaged on the remote client directly. A user of the remote client can select menu options, launch applications and documents, and perform other common "point-and-click" activities directly on the tablet using a local touch-friendly rendition of these menus. In another example, APIs configured to manage file and filesystems at the server-side desktop (e.g., File Explorer APIs) may be used to facilitate export of document folders for direct document launches and other file functions on the client device. In yet another example, APIs configured to manage process and threads at the server-side desktop (e.g., Application Process API's) allow remote launch and termination of applications using icons on the client device. By shifting key user interface activities such as menu operation, document operations, and application launches from the remote desktop running at the server to the client, embodiments of the disclosure dramatically improve user experience of traditional point-and-click applications used on touch screen devices, and augment the traditional remote display protocol driven user experience.

In the following description, numerous specific details are set forth in order to provide a thorough understanding of exemplary embodiments of the present disclosure. However, it will be apparent to one skilled in the art that the present disclosure may be practiced without some of these specific details. In other instances, well known process operations and implementation details have not been described in detail in order to avoid unnecessarily obscuring novel aspects of the disclosure.

Figure 1:
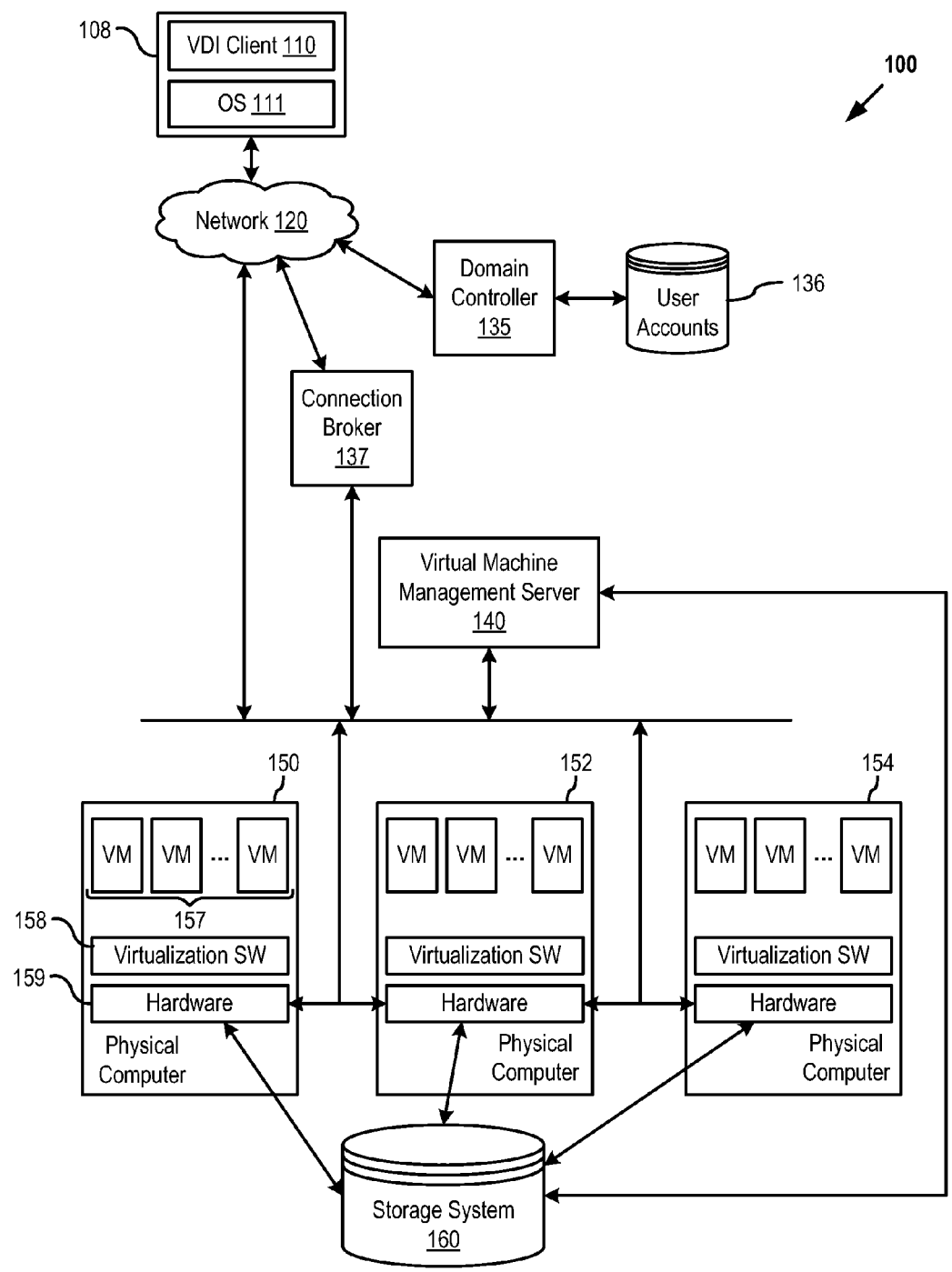
FIG. 1 illustrates components of a virtual desktop infrastructure (VDI) system in which one or more embodiments of the present disclosure may be implemented.

FIG. 1 illustrates components of a VDI system 100 in which one or more embodiments of the present disclosure may be implemented. In VDI system 100, VDI client software programs (also referred to as "VDI clients" for short), e.g., VDI client 110, run on operating systems of local computing devices, e.g., client device 108 on top of an operating system (OS) 111. VDI clients provides an interface for the users to access their desktops, which may be running in one of virtual machines 157 or blade server (not shown) in a data center that is remote from the users' location. The term "desktop" may refer to the instance of an interactive operating environment provided by a computer operating system and software applications, typically in the form of a display and sound output and keyboard and mouse input. With VDI clients, users can access desktops running in a remote data center through network 120, from any location, using a general purpose computer running a commodity operating system and a VDI client software program such as VMware® View™, or a special purpose thin client such as those available from Dell, HP, NEC, Sun Microsystems, Wyse, and others.

VDI system 100 may include a domain controller 135, such as Microsoft® Active Directory®, that manages user accounts 136 including user log-in information, and a connection broker 137 that manages connections between VDI clients and desktops running in virtual machines 157 or other platforms. Domain controller 135 and connection broker 137 may run on separate servers or in separate virtual machines running on the same server or different servers. In the embodiments of the present disclosure illustrated herein, desktops are running in virtual machines 157 are instantiated on a plurality of physical computers 150, 152, 154, each of which includes virtualization software 158 and hardware 159. Physical computers 150, 152, 154 may be controlled by a virtual machine management server 140, and be coupled to a shared persistent storage system 160.

All of the components of VDI system 100 communicate via network 120. For simplicity, a single network is shown but it should be recognized that, in actual implementations, the components of VDI system 100 may be connected over the same network or different networks. Furthermore, a particular configuration of the virtualized desktop infrastructure is described above and illustrated in FIG. 1, but it should be recognized that one or more embodiments of the present disclosure may be practiced with other configurations of the virtualized desktop infrastructure.

Figure 2:
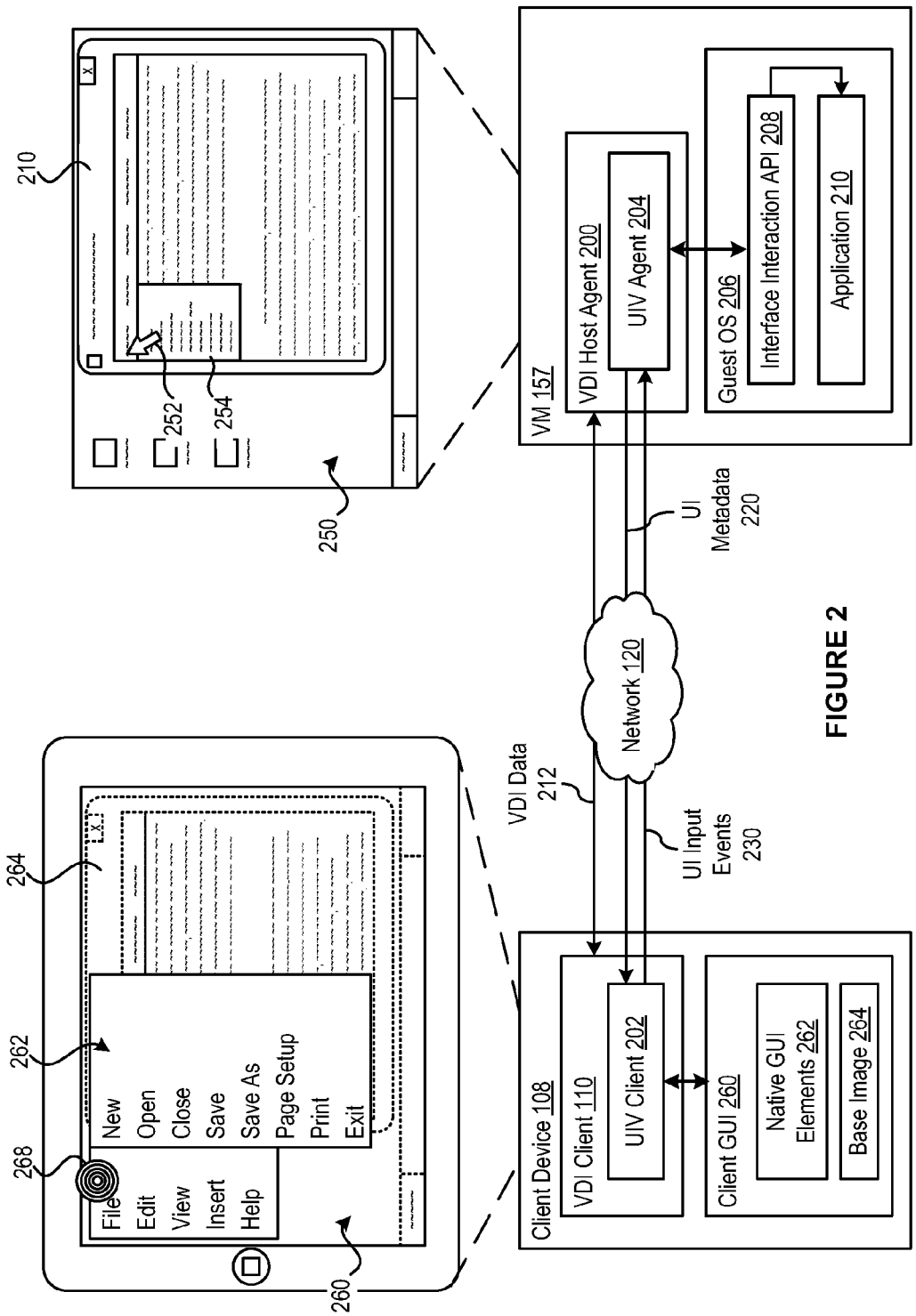
FIG. 2 illustrates in greater detail components of the VDI system in FIG. 1, according to one embodiment of the present disclosure.

FIG. 2 illustrates in greater detail components of VDI system 100 having a VDI client 110 that enables a user to access a desktop 250 running on VM 157 over network 120. VDI client 110 executing on client device 108 is configured to communicate with a VDI host agent 200 running in VM 157 to exchange VDI data 212 and provide access to remote desktop 250. In the embodiments described herein, client device 108 may be any computing device having an integrated display output and touch screen input. However, the disclosure should not be understood as being limited to these particular devices. For instance, alternate output devices such as a braille reader, and alternate input devices, such as voice activation (as further described below) may be utilized. Client device 108 typically has a "touch-and-gesture" style user interface that may differ from the "point-and-click" user interface of the desktop running on VM 157.

As shown in a call-out in FIG. 2, desktop 250 may include an application 210 having a traditional "point-and-click"-style user interface that relies on input from a pointer (e.g., mouse cursor 252) to manipulate or interact with UI elements 254 of application 210. The difference in styles of user interface between client device 108 and desktop 250 may worsen user experience and turn routine user tasks into frustrating exercises. This problem is especially clear from FIG. 2. Here, the graphical user interface of remote desktop 250 may have widgets and elements that expect manipulation and interaction with a smaller, more precise pointer (e.g., mouse cursor 252), and as such may have a small size that is difficult to target with a touch input (illustrated as circle 268).

According to an embodiment, VDI client 110 includes a user interface virtualization (UIV) client 202 configured to communicate with a corresponding UIV agent 204 running on VM 157 to translate between the "point-and-click" style user interface of the user desktop on VM 157 and the "touch-and-gesture" user interface of client device 108. In one embodiment, UIV client 202 and UIV agent 204 exchange messaging in the form of UI input events 230 and UI metadata 220 which are translated into remote desktop input and native GUI elements, respectively, at the appropriate endpoints.

In one embodiment, UIV agent 204 executing on VM 157 is configured to invoke an interface interaction API 208 to obtain metadata related to user interface (UI) widgets and elements seen on the desktop of VM 157. In one embodiment, interface interaction API 208 may be an API exposed by guest OS 206 to obtain metadata related to user interface (UI) widgets and elements seen on the desktop of VM 157. For example, interface interaction API 208 may be an API traditionally used by assistive technologies (e.g., screen readers) to make an application running on a guest OS or the guest OS itself more accessible to persons with vision, hearing, or motion impairments, for example, such as Microsoft Accessibility API, or automate software testing, such as Microsoft UI Automation API. Interface interaction API 208 is further configured to expose functionality of UI elements by enabling programmatic access (e.g., for UIV agent 204) to identify, manipulate, and interact with UI elements of guest OS 206 and applications 210 running on guest OS 206.

In one embodiment, interface interaction API 208 may include a software framework configured to build an application, such as the .NET® framework available from Microsoft Corporation, or Java Runtime Environments. It should be recognized that interface interaction API 208 may be a logical API inclusive of both OS and application framework APIs configured for the programmatic control of application behavior, and is not restricted to a single literal API provided by the OS or application. UIV agent 204 may have the ability to perform performing GPS-style "recalculation" within such application frameworks to determine efficient ways to activate any application function from any other point in an application's interface. Such "recalculation" functionality may be useful to insure injection of user input even when something goes wrong and an application's state is not what VDI client 110 expects at the point where a proxied action is sent to desktop-side UIV agent 204. In one embodiment, UIV agent 204 is configured to intercept rendering of UI elements in order to govern actual display of application menus and other objects, to determine state of an application and its application objects, and to perform simulated user actions on the UI elements. For example, a user's mouse click to open a context menu in an application may be intercepted by UIV agent 204 using OS level rendering function interception techniques and the resulting menu contents displayed instead on client device 108 using UIV client 202's local rendering. The application's native menu rendering running inside VM 157 is 'spoofed' such that context menu contents are not actually displayed inside guest OS 206. Such application 'spoofing' avoids unnecessary remote display traffic and aids in de-cluttering the resulting display on client device 108.

VDI host agent 200 is configured to exchange VDI data 212 to VDI client 110 including transmitting display data and receiving traditional mouse and keyboard input data according to conventional remote desktop techniques. VDI data 212 may include a base GUI image 264 that is used to display the GUI of remote desktop 250 at client device 108. In some embodiments, base GUI image 264 may be a graphical bitmap or framebuffer illustrating a portion of or an entirety of the display at desktop 250, similar to a screenshot of the remote desktop. In other embodiments, base GUI image 264 may be graphical information for drawings lines, polygons, and other shapes, fonts, and graphical primitives to render an image that displays the GUI of desktop 250 at client device 108.

In addition to VDI data 212 transmitted between VDI client 110 and VDI host agent 200, UIV agent 204 executing on VM 157 is configured to transmit UI metadata 220 to UIV client 202 on client device 108. UI metadata 220 includes information provided by interface interaction API 208 and other interception techniques controlled by UIV agent 204 that are descriptive of one or more UI elements of the user desktop on VM 157. Examples of UI elements that may be specified by UI metadata 220 include windows, buttons, menus, dialog or message boxes, lists, menu bars, scroll bars, title bars, status bars, size grips, toolbars, tree view controls, list view controls, dropdown lists, and input carets. In contrast to previous approaches which used graphical primitives or drawing operations for rendering at a VDI client, UI metadata 220 includes semantic information related to contents and application state of one or more UI elements of the user desktop. For example, rather than merely providing graphical primitives for drawing a rectangle menu, UI metadata 220 provides semantic information representing the contents of the menu, such as the selectable options in the menu. Based on UI metadata 220, VDI client 110 may independently render GUI elements that display, behave, and are interacted with differently than corresponding UI elements on the user desktop on VM 157. As such, UI metadata 220 enables UIV clients 202 within VDI client 110 to generate, render, and display native GUI elements (i.e., native to client device 108 in which VDI client 110 is executed) that are most appropriate for the interface style and form factor of client device 108 (e.g., touch screen). In one embodiment, information in the UI metadata 220 may be organized into a hierarchical or tree-like data structure having root elements and child elements corresponding to UI elements of a user desktop, as shown in greater detail in FIG. 3.

Figure 3:
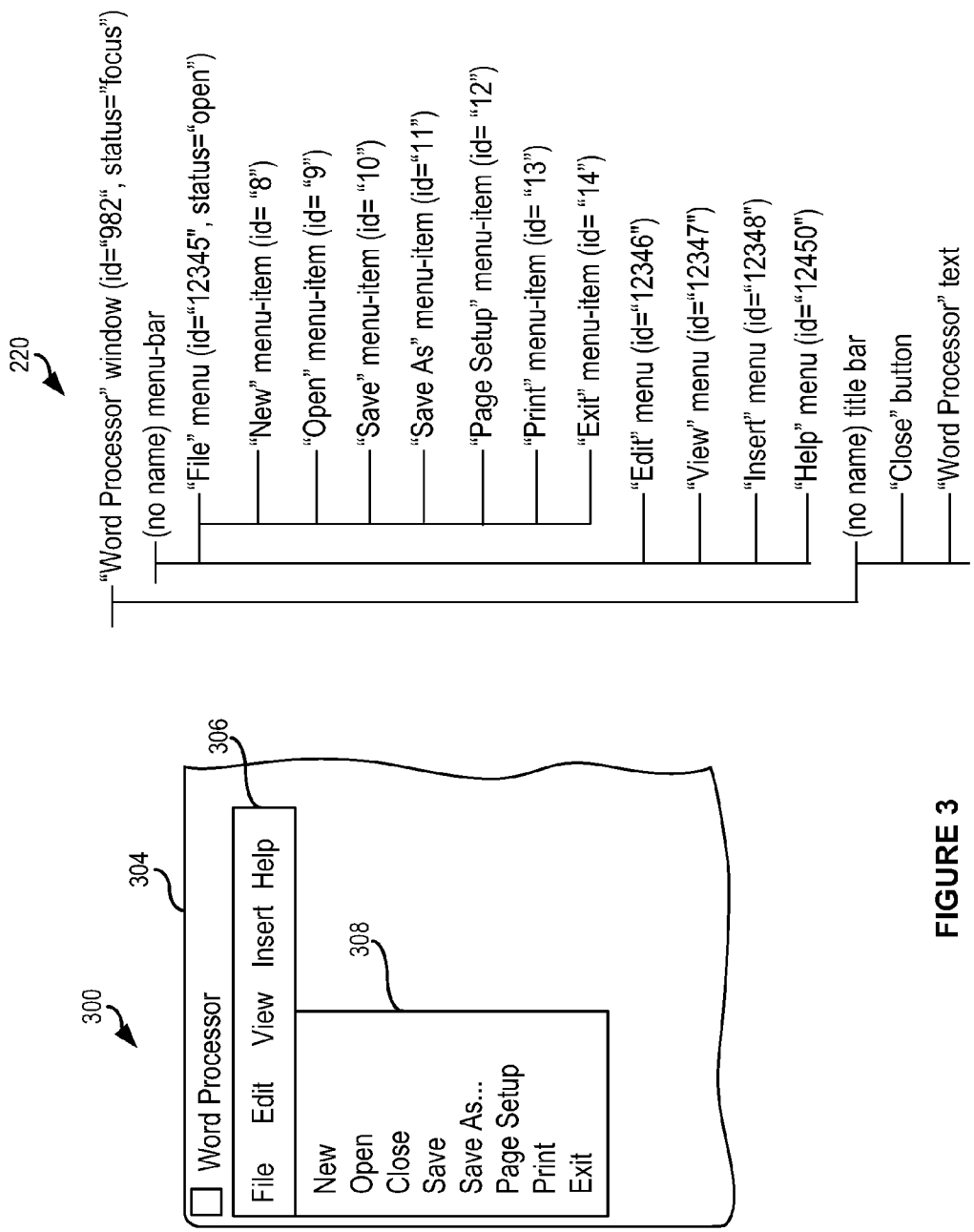
FIG. 3 illustrates a graphical user interface having a plurality of UI elements and corresponding metadata, according to one embodiment of the present disclosure.

FIG. 3 illustrates a graphical user interface 300 for an application 210 having corresponding UI metadata 220, according to one embodiment of the present disclosure. Graphical user interface 300 may be made of UI elements and sub-elements. As shown, graphical user interface 300 of application 210 includes a window 304 having a menu bar 306 with a plurality of menu options (e.g., "File," "Edit," "View," "Help," etc.). Each of these menu options may activate a submenu 308 which contains further options (e.g., "New," "Open," "Save," "Exit," etc.) and possible pop-out menus or dialog boxes.

In one embodiment, interface interaction API 208 allows application 210 to expose a tree structure of UI metadata 220 that represents the structure of graphical user interface 300. Elements in the tree expose properties and methods that facilitate programmatic manipulation of the GUI on desktop 250. In one embodiment, UI metadata 220 may include, for each UI element specified, a label for a UI element that is predetermined (e.g., assigned in code by a developer of application 210 and guest OS 206); role information describing the type of UI element (e.g., ROLE_SYSTEM_PUSH-BUTTON); properties that describe a UI element's state at a given moment in time (e.g., invisible, unavailable, focused, focusable, pressed, etc); and other values contained in a UI element (e.g., percentages, integers, non-integers, textual, visual) that may indicate information represented by the UI element. For example, UI metadata 220 may include information for window 304 that includes an identifier (e.g., id="982"), a state property indicating a window 304 is in "focus" within the remote desktop, and information for UI elements contained within window 304 (e.g., title bar and menu bar 306). In another example, metadata for menu 308 includes information for a plurality of menu items within menu 308, such as items for "New," "Open," "Save," etc. In some embodiments, UI metadata 220 may include graphical data, such as thumbnails or icons, associated with UI elements on desktop 250.

Referring back to FIG. 2, UIV client 202 is configured to construct and display a "native" UI element or widget having the same functionality and information as a corresponding UI element or widget on the remote desktop based on UI metadata 220 received from UIV agent 204. In one embodiment, UIV client 202 may generate a native, "touch-and-gesture"-style GUI element 262 that corresponds to "point-and-click"-style UI element 254 based on UI metadata 220 provided by interface interaction API 208. In some embodiments, native GUI elements 262 generated by UIV client 202 may be different than corresponding UI elements of desktop, such as having differences in size, shape, color, style, manner of interaction, animation, and interactive behavior. For example, UIV client 202 may use UI metadata 220 derived from a conventional drop-down list on remote desktop 250 to generate a native GUI element that appears like a large wheel that spins in response to swipe gestures. In another example, UIV client 202 may present a reformatted version of a navigation menu optimized for the form factor and touch-screen ergonomics of client device 108. As shown, a native GUI element 262 may be overlaid on top of base GUI image 264 represented in VDI data 212 to form a client GUI 260. In one embodiment, UIV client 202 is configured to use native graphical frameworks or user interface frameworks that are local to client device 108 to render one or more native GUI elements based on the received UI metadata 220.

UIV client 202 is further configured to capture user input on the constructed native GUI element 262 and transmit UI input events 230 to UIV agent 204 running in VM 157. In one embodiment, UIV client 202 is configured to generate UI input events 230 based on touch input 268 that represents interactions with the native GUI element 262. In one embodiment, UI input events 230 include information indicating that the corresponding GUI elements at the remote desktop 250 on VM 157 have been manipulated at the client device 108. In some embodiments, UI input events 230 may indicate a selection of, activation of, change of state in, or interaction with a corresponding UI element or option at remote desktop 250. In other embodiments, UI input events 230 may indicate execution or invocation of an operation or option corresponding to a UI element at remote desktop 250. According to UI input events 230 received from UIV client 202, UIV agent 204 is configured to query and invoke the corresponding UI elements of application 210 or guest OS 206 using interface interaction API 208 to simulate input and facilitate programmatic manipulation of the user interface of the remote desktop on VM 157.

Figure 4:
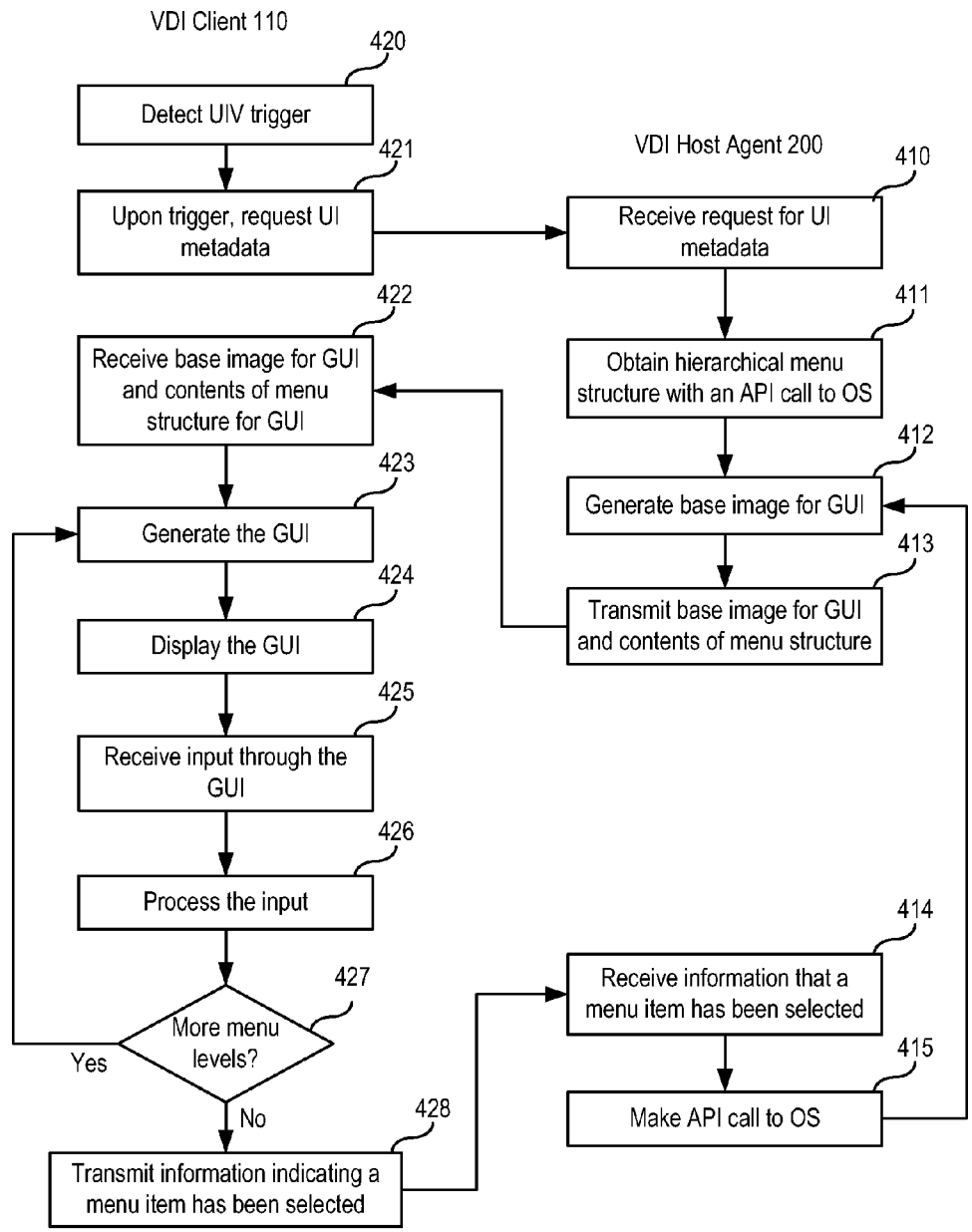
FIG. 4 illustrates a flow diagram for generating and updating a graphical user interface for an application that has been launched in a remote desktop and is to be displayed at a VDI client, according to one embodiment of the present disclosure.

FIG. 4 illustrates a flow diagram for generating and updating a GUI for an application that has been launched in a remote desktop and is to be displayed at a VDI client. Steps 410-415 are carried out by VDI host agent 200 running in a virtual machine that is hosting the remote desktop. Steps 420-427 are carried by VDI client 110. While FIG. 4 describes exemplary steps for providing menu navigation according to an embodiment of the disclosure, it should be recognized that techniques described herein may be extended to other UI experiences, including file dialogs, clipboard functions, launching of applications and documents, desktops, and application-specific experiences, as described later.

At step 420, VDI client 110 detects a UIV trigger performed by a user operating client device 108. In one embodiment, the UIV trigger may be a pre-determined gesture (e.g., a unique swipe gesture) performed by the user or a UI button activated by the user that indicates VDI client 110 should render one or more UI elements of an active application running on the remote desktop (e.g., application 210) using native GUI elements. At step 421, responsive to detecting a UIV trigger, VDI client 110 requests UI metadata from VDI host agent 200, which receives the request at step 410.

At step 411, in response to receiving a request for UI metadata, VDI host agent 200 makes an API call to interface interaction API 208 of guest OS 206 to obtain UI metadata (e.g., UI metadata 220) for application 210. For example, VDI host agent 200 may obtain a hierarchical menu structure having a list of menus, sub-menus, and menu items of an in-focus application. In one embodiment, rather than return metadata for every UI element on the remote desktop, UIV agent 204 may identify a subset of UI elements of the user desktop, and generate UI metadata 220 only for the subset of UI elements. For example, UIV agent 204 may only generate UI metadata for the application that currently has focus. In another embodiment, UIV agent 204 may generate UI metadata for one or more UI elements on the remote desktop based on the received request for UI metadata. For example, UIV agent 204 may generate UI metadata for the hierarchical menu bar based on a request from VDI client 110 that indicates only menu metadata are requested. In some embodiments, VDI host agent 200 may proactively request UI metadata from guest OS 106 in response to detected changes in the active application or the underlying guest OS 106 (e.g., via events received via a Windows Event callback function).

At step 412, VDI host agent 200 generates a base image for the GUI (e.g., according to a VDI protocol established between VDI client 110 and VDI host agent 200) and transmits the base image for the GUI along with the contents of the hierarchical menu structure to VDI client 110 at step 413. As described above, the base image (e.g., base GUI image 264) provides graphical information for displaying an image of the remote desktop at the client device. In one example, the base image may be raw pixel data, similar to a screenshot, of the entire desktop 250 to be displayed at the client device. In another example, the base image may be an updated set of pixel data to changing at least a portion of earlier-transmitted raw pixel data. In some embodiments, the base image may be drawing operations and graphical primitives for drawing the display of the remote desktop within a client GUI of the client device.

In one embodiment, the UIV client 202 and UIV agent 204 may use a messaging bus or message passing service to transmit and receive UI input events 230 and UI metadata 220 across network 120. In another embodiment, VDI host agent 200 may incorporate UI metadata 220 within VDI data 212 passed through a remote display channel (e.g., PCoIP, HTML5) to VDI client 110. Similarly, VDI client 110 may incorporate UI input events 230 within VDI data 212 transmitted to VDI host agent 200.

At step 422, VDI client 110 receives the base image for the GUI along with the contents of the hierarchical menu structure. At step 423, VDI client 110 renders the GUI based on the received base image and contents of the hierarchical menu structure, and at step 424, displays the GUI. The displayed GUI includes the base image received from VDI host agent 200 and native GUI elements (i.e., native to client device 108 in which VDI client 110 is executed) that VDI client 110 generated based on the contents of the menu structure. In some embodiments, the native GUI elements are included in the displayed GUI as UI elements overlaid on top of the base image received from VDI host agent 200. In some embodiments, the native GUI elements are included in the displayed GUI as a semi-transparent layer incorporated into the base image received from VDI host agent 200. In one embodiment, VDI client 110 generates native GUI elements configured to be "touch-friendly." For example, VDI client 110 generates native GUI elements having a size and shape that more readily facilities activation by a touch object (e.g., human finger or stylus) as compared to a GUI element configured for activation by a pointer or mouse cursor. In another example, VDI client 110 generates native GUI elements responsive to touch-based input and gestures, including taps, swipes, multi-point gestures, etc. As such, the user experiences an improved user interface because VDI client 110 enables the user to interact with native GUI elements that are rendered in a touch-friendly manner yet correspond to UI elements from the remote desktop. Furthermore, embodiments of the present disclosure may use native graphical frameworks or user interface frameworks that are local to client device 108 thereby offloading work and relying on the graphical capabilities of client device 108.

At step 425, VDI client 110 detects an input (e.g., a touch screen input) made by the user through the GUI onto the native GUI elements. In response to detecting an input, VDI client 110 processes the input at step 426. In the example of the hierarchical menu structure, the input may of a type that causes menu items of a lower level to be displayed or may be a final selection. If it is the former, the flow returns to step 423 where the GUI is generated for display again. If the input is a final selection from the menu, information (e.g., UI input events 230) indicating that a certain menu item has been selected is transmitted to the VDI host agent at step 426.

At step 414, the VDI host agent receives the information indicating that the certain menu item has been selected. At step 415, the VDI host agent makes an API call (e.g., to interface interaction API 208) to the guest OS to communicate that the certain menu item has been selected. The flow then returns to step 411 where the base image for GUI may be regenerated.

In some embodiments, the VDI host agent programmatically manipulates the user interface of the guest OS using an identifier that specifies an object within an object model of guest OS 206. In contrast to previous approach which simply invoked the server's keyboard and mouse driver to simulate keyboard and mouse events, UIV agent 204 uses interface interaction API 208 to directly manipulate UI elements of desktop 250 according to the UI input events received from the VDI client. In some embodiments, UIV agent 204 passes the received UI input events directly to interface interaction API 208, in cases where UIV client 202 transmits UI input events that are already configured for use by interface interaction API 208. In other embodiments, UIV agent 204 translates received UI input events into events or parameters for interface interaction API 208 to indicate application state or property values of one or more UI elements have been changed. By way of example, UIV agent 204 may use interface interaction API 208 to indicate, for a given UI element, element activation, element selection, spatial navigation, logical navigation, alerts, focus changes, and other property value changes.

According to one embodiment, VDI client 110 improves latency and responsiveness for UI elements that require multiple user interactions, such as scrolling through items in a drop-down list, or navigating menus and sub-menus. In one example use case, menu navigation on a desktop may involve pointing and clicking on a "Edit" menu button, causing a drop-down menu to appear, pointing and clicking on a menu item, which may cause additional menus to appear (e.g., "Paste Special . . . ", etc.). To perform this use case under previous approaches to remote desktops, a VDI client might have to receive an image of a GUI for the window and menu bar over the remote network, and render the appearance of the window menu bar (which might include frames of GUI animation); transmit click input; receive an image of a GUI for the window, menu bar, and now Edit menu over the remote network, and render the appearance of the window, menu bar, and now Edit menu; transmit click input (possibly for one of the menu items), and so forth. In contrast, embodiments of the disclosure enable VDI client 110 to construct and modify native GUI elements using UI metadata without having to make repeated network requests which increase latency and create a "laggy" user experience. In fact, embodiments of the disclosure provide a means of accessing menu navigation metadata within an application even before a user selects a menu option. Interface-related operations that use graphical feedback, like drag-and-drop, box resizing, and key animations, are performed locally on the client device, for example, as a remote session overlay, and then executed within the remote session.

While embodiments of the present disclosure describe a remote desktop system that generates native GUI elements of a touch-based, gesture-driven interface configured for a touch screen on a client device, various embodiments of the client device described herein may include alternative non-touch-based input devices, such as a microphone, accelerometer, gyroscopic sensor, near-field communications sensor, etc., that may be configured to control a remote desktop according to techniques described herein.

Additionally, embodiments of the present disclosure may apply techniques for user interface virtualization to tasks and user interactions beyond the menu navigation example described above. As described in greater detail below, navigation of file dialogs that open, save, move, and re-name files may be shifted to a UIV client running on a client device according to techniques for user interface virtualization. In another embodiment, a "clipboard" that temporarily stores data via cut, copy, and paste operations may be shifted to a UIV client running on a client device according to techniques for user interface virtualization described herein. In another embodiment, operations of a desktop "start menu" or similar launching point may be shifted to a UIV client running on a client device according to techniques for user interface virtualization described herein. In another embodiment, a task switcher for switching between active programs may be shifted to a UIV client running on a client device according to techniques for user interface virtualization described herein. In another embodiment, a context menu in a graphical user interface may be shifted to a UIV client running on a client device according to techniques for user interface virtualization described herein.

User Interface Virtualization of File Dialogs

Figure 5:
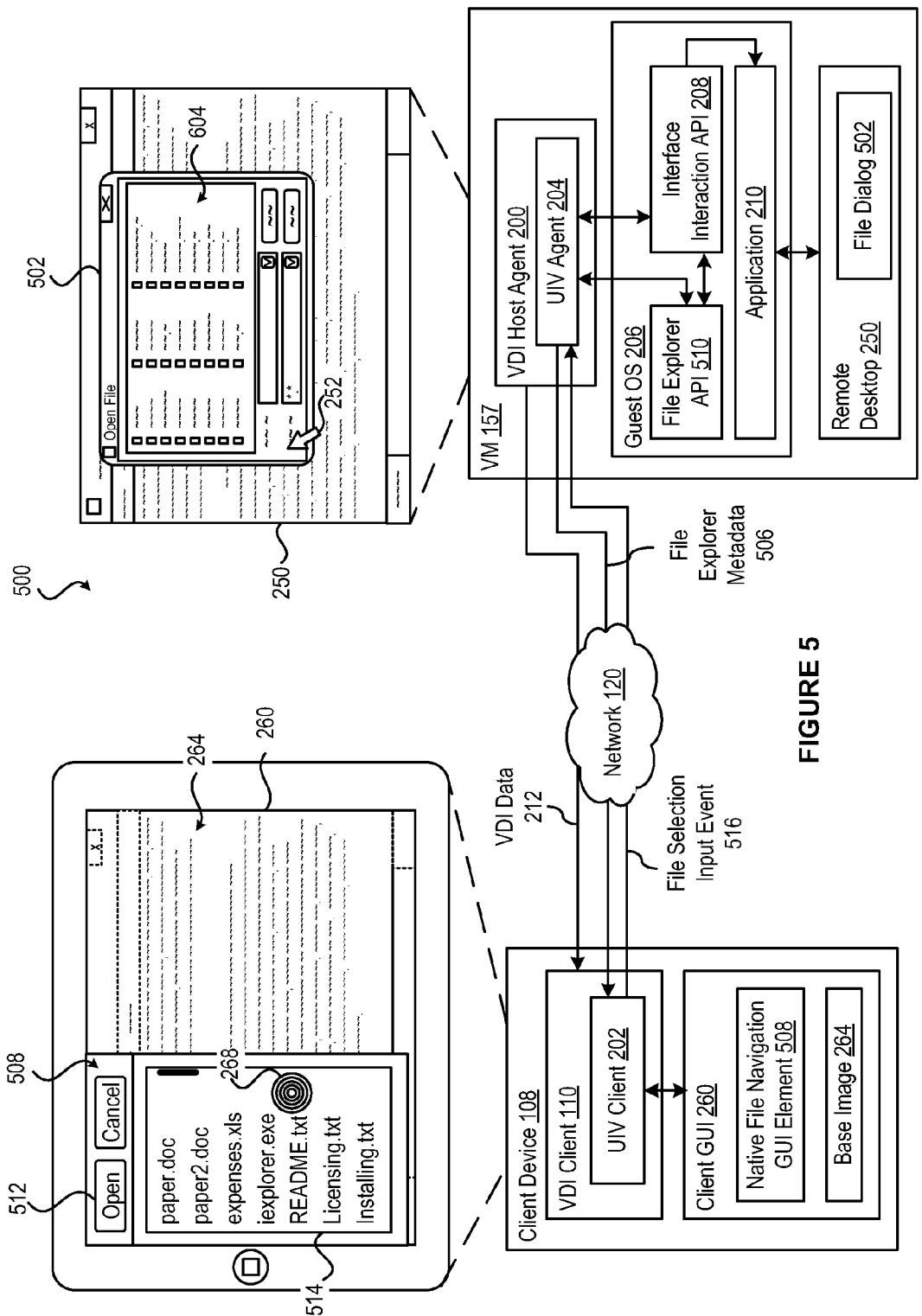
FIG. 5 illustrates components of a VDI system for providing access to a file navigation GUI of a server device, according to one embodiment of the present disclosure.

FIG. 5 illustrates components of a VDI system 500 having a VDI client 110 that enables access to file navigation GUI of an application executing on VM 157 over network 120. VDI client 110 executing on client device 108 is configured to communicate with a VDI host agent 200 running in VM 157 to exchange VDI data 212 and provide access to a remote GUI (e.g., remote desktop 250) of VM 157.

In the embodiment of FIG. 5, an application 210 running on VM 157 may be configured in a document-centric paradigm that requires interaction with a UI element, referred to as a file dialog 502, to navigate a filesystem or listing of files. File dialog 502, sometimes referred to as a file selector, file chooser, file requester, or open/save dialog box, is configured to allow a user to select a file from the filesystem of guest OS 206 and may perform other file-related tasks, such as opening, saving, moving, and renaming documents or files stored for application 210. As shown, file dialog 502 may have a traditional "point-and-click" style user interface that relies on input from a pointer (e.g., mouse cursor 252) and may be difficult to navigate from a touchscreen of client device 108. For example, file dialog 502 may have a graphical listing of files 504 having an icon and filename text that are difficult to individually select using touch input.

According to an embodiment, UIV client 202 is configured to communicate with UIV agent 204 running on VM 157 to translate a "point-and-click" style file navigation UI element into a native, "touch-and-gesture" style file navigation UI element at client device 108. In one embodiment, UIV agent 204 running on VM 157 is configured to detect when application 210 has invoked a file dialog 502 that prompts the user to select a file. Upon detecting such an event, UIV agent 204 invokes a file explorer API 510 to obtain file content metadata 506 that specifies information related to files on VM 157. In one embodiment, file explorer API 510 is an API exposed by guest OS 206 that enables access to metadata related to one or more files in the filesystem of guest OS 206. In one embodiment, file content metadata 506 is organized into a hierarchical or tree-like data structure having root elements and child elements corresponding to directories and files, respectively, of the filesystem. File content metadata 506 may include a listing of file objects having file names, file types, last date modified, file size, and other information relating to a corresponding file. File content metadata 506 may further include graphical information, such as a file icon associated with a file type or a particular file and a thumbnail image representing the contents of a file.

In one embodiment, UIV agent 204 obtains file content metadata 506 for one or more files based on UI metadata corresponding to file dialog 502 invoked by application 210. For example, in some cases, a file dialog 502 invoked by application 210 may initially display a listing of files (e.g., files 504) from a default file location, such as a home directory or last used directory. As such, UIV agent 204 may use interface interaction API 208 to determine a filesystem location (e.g., directory path) shown initially by file dialog 502, and then obtain file content metadata 506 via file explorer API 510 for files located at that filesystem location. In another example, file dialog 502 invoked by application 210 may have a filter applied to a listing of files 504 displayed, such as a filter based on filename (e.g., "log*.*") or a filter based on file type (e.g., "*.pdf", "GIF files only"). As such, UIV agent 204 may use interface interaction API 208 to determine one or more filters applied to file dialog 502, and then obtain file content metadata 506 via file explorer API 510 for files that satisfy the determined filters.

In another embodiment, UIV agent 204 obtains file content metadata 506 for one or more files based on usage data received from UIV client 202. For example, UIV agent 204 may obtain file content metadata 506 for files found in a last known filesystem directory navigated to by a native file navigation GUI element 508, described later, for files at a filesystem location of a last selected file, or for files at commonly-selected or commonly navigated directories or filesystem locations.

Based on file content metadata 506 received from UIV agent 204, UIV client 202 executing at client device 108 is configured to construct and display a native file navigation GUI element 508 (or other native GUI element 262) having a similar functionality and information as the corresponding file dialog 502. In the embodiment shown in FIG. 5, native file navigation GUI element includes one or more buttons 512 and a scrollable listing of files 514 having a size, shape, color, style, manner of interaction, animation, and interactive behavior configured to be native to client device 108. For example, buttons 512 (e.g., "Open", "Cancel") may be sized larger than corresponding buttons of file dialog 502, enabling a more comfortable user experience. In another example, rather than using point-and-click style UI elements of file dialog 502 to navigate a filesystem, scrollable listing of files 514 may be navigated using touch input, such as a up-down swipe gesture to scroll through a listing of files, a right-left swipe gesture to navigate up one directory level, or a two-finger left-right swipe gesture to go back or forward to a previously navigated filesystem location. In the embodiment shown, native file navigation GUI element 508 is rendered on top of, or overlaid, on a base image 264 that is a graphical representative of the remote GUI on VM 157.

UIV client 202 receives any touch-and-gesture input (illustrated as touch input 268) on native file navigation GUI element 508 and transmits an appropriate file selection input event 516 back to UIV agent 204. In one embodiment, file selection input event 516 is an indication specifying a file selected by native file navigation GUI element 508, such as a file path or other information identifying a selected file.

UIV agent 204 is configured to receive file selection input event 516 and modify file dialog 502 based on the received file selection. In one embodiment, UIV agent 204 invokes interface interaction API 208 to inject a filepath specified by file selection input event 516 into an appropriate field of file dialog 502. UIV agent 204 may further use interface interaction API 208 to manipulate a button that activates the file selection (e.g., "Open" or "Select" button) and closes out file dialog 502. As such, embodiments of the present disclosure enable UIV agent 204 and UIV client 202 to seamlessly proxy navigation and selection of file objects from a remote desktop 250 to a client GUI 260.

In an alternative embodiment of VDI system 500, upon detecting an application 210 has invoked a file dialog 502, UIV agent 204 is configured to intercept and spoof the system calls to open a file dialog such that a file dialog 502 is not actually rendered on remote Desktop 250. Instead, file navigation is shifted entirely to a native file navigation GUI element 508 rendered and displayed entirely on client device 108. This alternative embodiment is illustrated on client GUI 260 shown in a callout of FIG. 5. As shown, a base image 264 (e.g., received via VDI data 212) is displayed underneath native file navigation GUI element 508 and does not include a graphical representation of file dialog 502.

User Interface Virtualization of Clipboard

Figure 6:
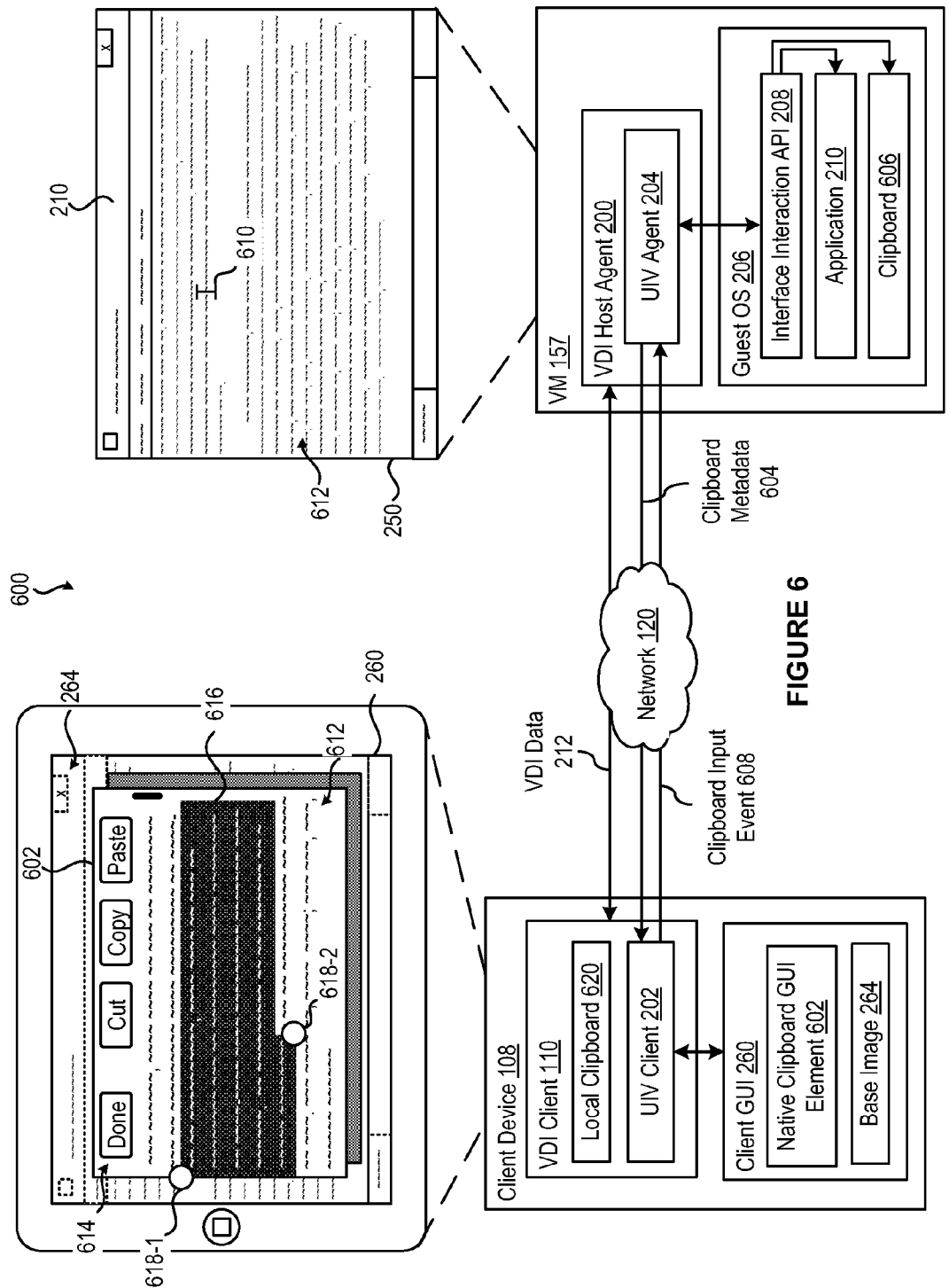
FIG. 6 illustrates components of a VDI system for providing access to clipboard functionality of a server device, according to one embodiment of the present disclosure.

FIG. 6 illustrates components of a VDI system 600 having a VDI client 110 that enables access to a clipboard functionality of an application executing on VM 157 over network 120. Similar to VDI systems described above, VDI client 110 executing on client device 108 is configured to communicate with a VDI host agent 200 running in VM 157 to exchange VDI data 212 and provide access to a remote GUI (e.g., remote desktop 250) of VM 157.

In the embodiment of FIG. 6, guest OS 206 and application running on guest OS 206 (e.g., application 210) are configured to support use of a clipboard 606 that can be used for short-term data storage and data transfer between documents and applications via cut, copy, and paste operations. However, content to be cut or copied to clipboard 606 has to be first selected, usually by manipulating a text caret 610 (e.g., via clicking and dragging a pointer, or via SHIFT key and directional arrow keys). As such, it may be difficult for users to manipulate text and other content when using the clipboard at remote desktop 250 through touch input at client device 108. Further, network latency between a remote desktop and an accessing client may introduce user interface "jitter" or choppiness, thereby making it difficult to perform text selection at a high level of precision, for example, on the level of an individual text character.

According to an embodiment, UIV client 202 is configured to communicate with UIV agent 204 running on VM 157 to enable a user to manipulate content for clipboard functionality of the remote desktop using a native, "touch-and-gesture" clipboard GUI element 602 rendered at client device 108. In addition to VDI data 212 transmitted between VDI client 110 and VDI host agent 200, UIV agent 204 and UIV client 202 exchange clipboard metadata 604 and clipboard input event 608, described below, to manipulate a clipboard at remote desktop 250 using a native GUI element constructed at client device 108.

In one embodiment, VDI client 110 is configured to detect a UIV trigger performed by a user operating client device 108. The UIV trigger may be a pre-determined gesture performed by the user (e.g., holding down one finger) or an on-screen button activated by the user. In response to detecting the UIV trigger, UIV client 202 transmits to UIV agent 204 a clipboard input event 608 indicating a UIV clipboard feature has been activated and requesting for clipboard metadata 604.

In response to a request for clipboard metadata 604, UIV agent 204 makes an API call exposed by guest OS 206 to obtain clipboard metadata 604. In one embodiment, UIV agent 204 retrieves text or other content 612 from an open and active application 210 seen on remote desktop 250. For example, UIV agent 204 may use interface interaction API 208 to retrieve any text or other content that is visible through the viewport element of an application 210 that has focus on remote desktop 250. In one embodiment, UIV agent 204 further obtains clipboard metadata 604 that includes current contents of a clipboard 606 at guest OS 206 (e.g., via interface interaction API 208 or other API exposed by guest OS 206). UIV agent 204 transmits the generated clipboard metadata 604 to UIV client 202 on client device 108.

UIV client 202 is configured to construct and display a native clipboard GUI element 602, based on the received clipboard metadata 604, which provides a mechanism for selecting a region of text 612 (and other content) using touch input. In the embodiment shown in FIG. 6, native clipboard GUI element 602 renders text 612 and other content provided by clipboard metadata 604 in a manner suitable for viewing on client device 108. For example, native clipboard GUI element 602 may display text 612 with an increased font size for each of viewing and to enable a user to target a specific text character with touch input. As shown, native clipboard GUI element 602 may be displayed on top of, or overlaid, on a base image 264 that is a graphical representative of remote desktop 250 on VM 157.

In one embodiment, native clipboard GUI element 602 is configured to receive one or more touch inputs to manipulate a selection region 616 that designates some portion of text 612 as selected. As shown, selection region 616 may be defined by a position of one or more handles (illustrated as a beginning handle 618-1 and a closing handle 618-2) disposed at ends of the selection region. A user may select a portion of text 612 by modifying the position of handles 618-1 and 618-2, thereby enlarging or shrinking the size and altering the shape of selection region 616. In one embodiment, handles 618 are sized to a diameter suitable for a user to target each handle 618 with touch input (e.g., a finger). Accordingly, by providing a local text selector mechanism, UIV client 202 removes network latency driven jitter commonly experienced during clipboard operations in traditional VDI environments. In an alternative embodiment (not shown), native clipboard GUI element 602 includes a native text cursor or caret (similar to remote text caret 610) that may be re-positioned within text 612 based on touch input to define a position, for example, for inserting new text or pasting new content.

UIV client 202 is further configured to capture user input on native clipboard GUI element 602 and transmit one or more clipboard input events 608 to UIV agent 204 running in VM 157. UIV agent 204 may then make an API call (e.g., interface interaction API 208) to modify state of desktop or clipboard 606 based on the received clipboard input event 608. In one example, a user may perform a selection of the locally copied text using native clipboard GUI element 602 and upon completion of the selection (e.g., indicated by activating "DONE" button), UIV client 202 transmits a clipboard input event 608 indicating the selected text to UIV agent 204. UIV agent 204 invokes interface interaction API 208 to select text indicated by the received clipboard input event 608, which may then be shown on remote desktop 250 as selected.

In one embodiment, native clipboard GUI element 602 is configured to display and edit contents of remote clipboard 606. As shown in FIG. 6, native clipboard GUI element 602 includes buttons 614 configured to trigger a corresponding clipboard operation (e.g., cut, copy, paste) on remote desktop 250 based on a local text selection. For example, UIV client 202 detects input on a button 614 corresponding to a COPY operation and transmits a clipboard input event 608 to UIV agent 204 that specifies a clipboard COPY operation to be performed on remote clipboard 606 at remote desktop 250, and that includes a copy of text and other content selected by selection region 616. UIV agent 204 receives the clipboard input event and invokes interface interaction API 208 to select the text indicated and then invoke a copy operation on clipboard 606, or alternatively, directly invoke a copy operation on clipboard 606 that specifies the selected text.

In an alternative embodiment, VDI client 110 is configured to duplicate remote clipboard 606 to a local clipboard 620 at client device 108. Clipboard 620 may be used for local-to-local data transfer between applications on client device 108, for local-to-remote data transfer between an application on client device 108 and an application 210 on VM 157, and for remote-to-remote data transfer between applications 210 on VM 157. In one embodiment, UIV client 202 is configured to use received clipboard metadata 604 to update clipboard 620 to correspond to contents of remote clipboard 606 at VM 157.

User Interface Virtualization of Start Menu

Figure 7:
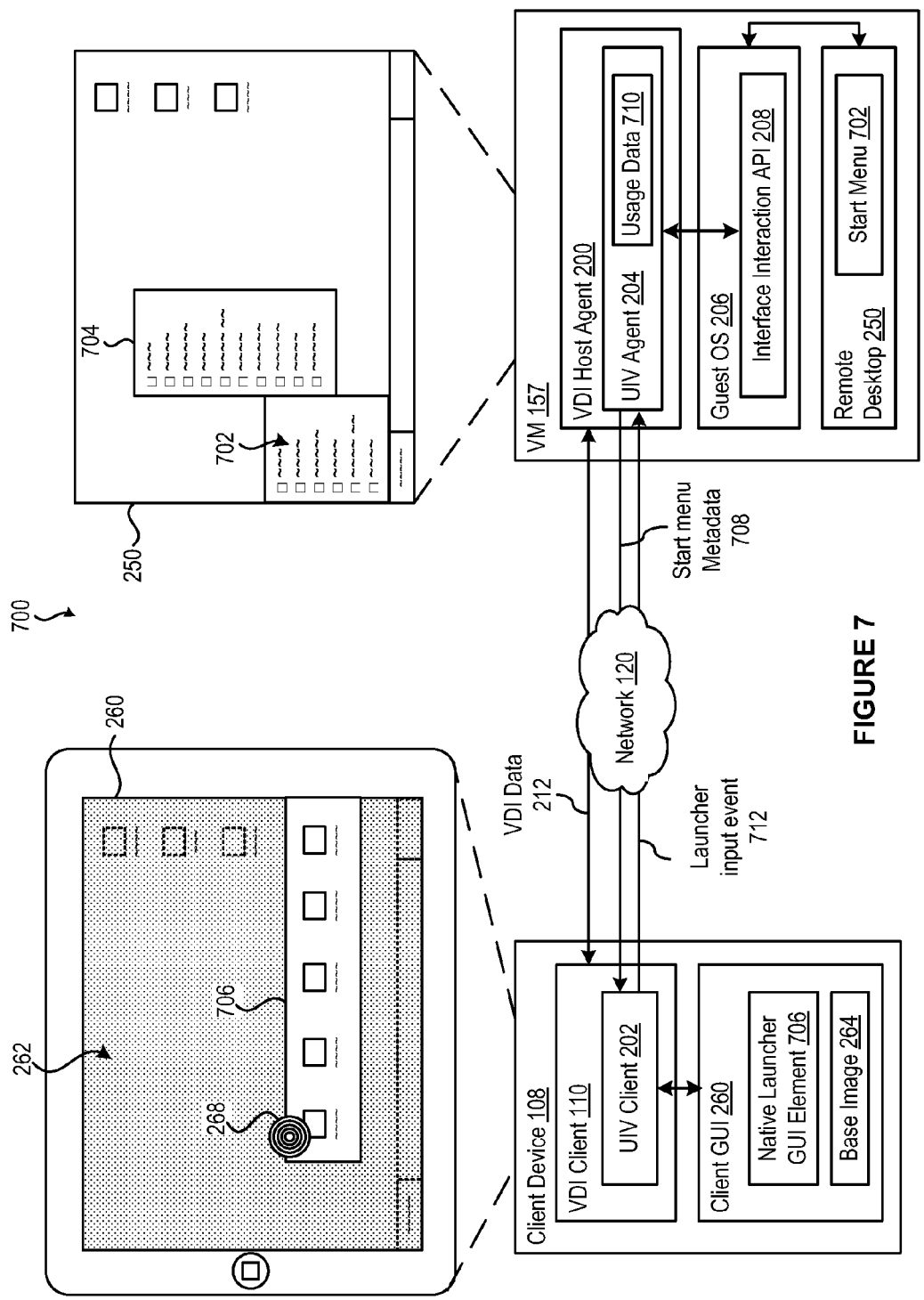
FIG. 7 illustrates components of a VDI system for providing access to an application launcher GUI of a server device, according to one embodiment of the present disclosure.

FIG. 7 illustrates components of a VDI system 700 having a VDI client 110 that enables access to a file or application launcher GUI of a guest operating system 206 executing on VM 157 over network 120. VDI client 110 executing on client device 108 is configured to communicate with a VDI host agent 200 running in VM 157 to exchange VDI data 212 and provide access to a remote GUI (e.g., remote desktop 250) of VM 157.

In the embodiment of FIG. 7, guest OS 206 running on VM 157 includes a UI element, referred to as a start menu 702, that provides a central point for launching applications and performing tasks. Start menu 702, sometimes referred to as an application launcher, file launcher, or application menu, is configured to enable a user to launch an application, open a file, change system settings, access help information, and perform other tasks. Start menu 702 may have a traditional "point-and-click" style user interface that relies on input from a pointer (e.g., mouse cursor 252) may be difficult to navigate from a touch screen of client device 108. For example, as shown, start menu 702 may be organized into a nested menu of items and sub-menus 704 of items (e.g., programs, files) that may be difficult to navigate using touch input.

According to an embodiment, VDI client 110 includes UIV client 202 configured to communicate with UIV agent 204 running on VM 157 to generate a native launcher GUI element 706 that is a virtual representation of start menu 702 at client device 108.

In one embodiment, VDI client 110 is configured to detect a UIV trigger performed by a user operating client device 108 to activate native launcher GUI element 706. For example, VDI client 110 may detect a swipe gesture or tap performed by a user on an on-screen "stub" UI element to slide out native launcher GUI element 706 from a hidden view. In response to detecting the UIV trigger, UIV client 202 transmits to UIV agent 204 a request indicating native launcher GUI element 706 has been activated and requesting start menu metadata 708.

In response to a request for start menu metadata 708, UIV agent 204 makes an API call to interface interaction API 208 exposed by guest OS 206 to obtain start menu metadata 708. In one embodiment, start menu metadata 708 includes information relating to each item contained within start menu 702, such as an item name (e.g., "Microsoft Word"), item type (e.g., application, document), graphical icon, graphical thumbnail, an item identifier that uniquely identifies the item within start menu 702, and a location path to a corresponding file within filesystem of guest OS 206. UIV agent 204 transmits the generated start menu metadata 708 to UIV client 202 on client device 108.

In one embodiment, UIV agent 204 is configured to store usage data 710 that defines a pattern of client-side selections from the start menu. In response to a request for start menu metadata 708, UIV agent 204 may apply a variety of filters and heuristics to usage data 710 to identify a subset of items in start menu 702 that may be most desired by UIV client 202, and obtain start menu metadata 708 for the identified subset of items based on usage data 710.

UIV client 202 is configured to construct and display a native launcher GUI element 706, based on the received start menu metadata 708. Native launcher GUI element 706 may be configured to present a compact set 712 of applications and documents for rapid selection and that may be ordered based on usage pattern represented by usage data 710. In one embodiment, native launcher GUI element 706 contains a plurality of items corresponding to the items within start menu 702, such as a plurality of shortcuts to applications (e.g., "Programs") and a plurality of documents (e.g., "My Documents"). Alternatively, native launcher GUI element 706 contains a reduced set of items that is less than the plurality of items within start menu 702 at remote desktop 250. As shown, native launcher GUI element 706 may be displayed on top of, or overlaid, on a base image 264 that is a graphical representative of remote desktop 250 on VM 157.

UIV client 202 is configured to capture user input on native launcher GUI element 706 and transmit a launcher input event 712 to UIV agent 204 running in VM 157. In one embodiment, launcher input event 712 includes a reference that identifies an item within native launcher GUI element 706 and that corresponds to an item within start menu 702, and further includes an indication that the referenced item has been launched. In response to receiving launcher input event 712, UIV agent 204 makes an API call (e.g., via interface interaction API 208) to invoke the item within start menu 702 that is referenced by launcher input event 712. For example, UIV agent 204 may make an API call using interface interaction API to launch an application specified by launcher input event 712. In another example, UIV agent 204 may use interface interaction API to open a home directory as specified by launcher input event 712.

In one embodiment, UIV agent 204 may modify usage data 710 to include the received launcher input event 712, thereby incorporating the selection into a record of the user's past application launches, document selections, and other interactions that may be used in subsequent requests for start menu metadata 708. Accordingly, UIV client 202 and UIV agent 204 are configured to refine a user experience for a given user over time and provides system administrator with a dataset for understanding priorities of users of mobile devices, such as client device 108.

User Interface Virtualization of Active Program Selection

Figure 8:
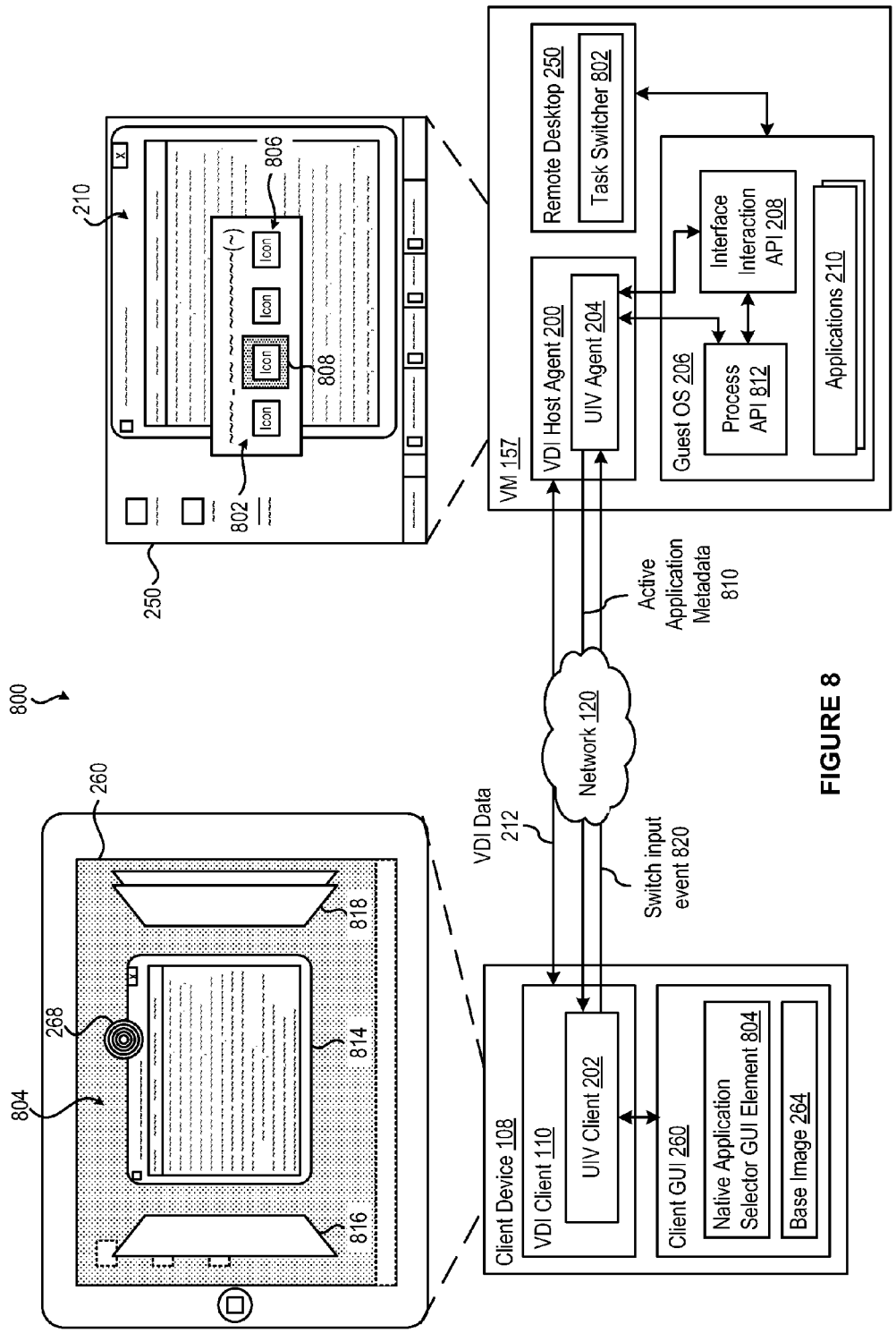
FIG. 8 illustrates components of a VDI system for providing access to an active program selection GUI of a server device, according to one embodiment of the present disclosure.

FIG. 8 illustrates components of a VDI system 800 having a VDI client 110 that enables access to an active program selection GUI on VM 157 over network 120. As shown, guest OS 206 running on VM 157 includes a UI element, referred to as a task switcher 802, that enables a user to switch between top-level windows (e.g., running applications) or alternate between two most recent applications. A "top level window" may refer to any window corresponding to a running application or a document loaded into a running application, interchangeably. As shown, task switcher 802 is displayed on top of other windows and includes a plurality of icons 806 that represent an open top level window. In one embodiment, icons 806 may be a thumbnail image that renders a display representative of the contents of the top level window. For example, an icon 806 corresponding to an open browser window may be rendered as a miniature image of the contents of a web page displayed in the browser. A user may operate task switcher 802 to select one of the plurality of running applications, as depicted as a highlight box 808. However, task switcher 802 is typically activated through use of a keyboard combination with at least one modifier (e.g., ALT and Tab) that may be difficult to simulate using touch input on a client device 108. Further, operating task switcher 802 can be a frustrating task when remote desktop 250 is displayed on client device 108 too small to properly distinguish the running applications or open documents via thumbnails and icons 806.

According to an embodiment, VDI client 110 includes UIV client 202 configured to communicate with UIV agent 204 running on VM 157 to generate a native application selector GUI element 804 that is a virtual representation of task switcher 802 at client device 108. UIV agent 204 running on VM 157 is configured to transmit active application metadata 810 that includes information relating to a plurality of open applications (e.g., application 210) running on guest OS 206. In one embodiment, UIV agent 204 obtains active application metadata 810 using API calls to one or more APIs exposed by guest OS 206, such as interface interaction API 208 and a process API 812 configure to obtain information about processes running in guest OS 206. Active application metadata 810 may include a list of running applications on guest OS 206 and may include information relating to the applications, such as a window identifier associated with the application, and graphical information, such as a thumbnail image that provides a graphical representation of the running application.

In one embodiment, UIV client 202 is configured to generate native application selector GUI element 804 that enables a user to traverse the list of running applications using touch input 268, such as a swipe input to pan from one application to another. For example, in the embodiment shown in FIG. 8, native application selector GUI element 804 is configured to provide a "cover flow" style user interface that displays a currently selected application 814 in a center position, and renders previous applications 816 and next applications 818 in the list of running applications on the periphery of the currently selected application 814 at center. As shown, graphical representations of applications 814, 816, 818 are rendered at a size larger than the thumbnails of task switcher 802 on remote desktop 250 that enables a user operating client device 108 to distinguish contents of each window.

In one embodiment, upon receiving a touch input (e.g., tap) on a currently selected application 814, UIV client 202 transmits a switch input event 820 to UIV agent 204. UIV agent 204 may use process API 812 to programmatically manipulate guest OS 206 to switch to an application referred to in the received switch input event 820.

User Interface Virtualization of Context Menus

As described earlier, the user interface virtualization techniques may be applied to a wide variety of UI elements, including windows, dialog boxes, and menus. One specific example of a menu to which user interface virtualization may be extended is a context menu, sometimes referred to as a contextual, shortcut, or pop-up menu, and is described in greater detail in conjunction with FIG. 9.

Figure 9:
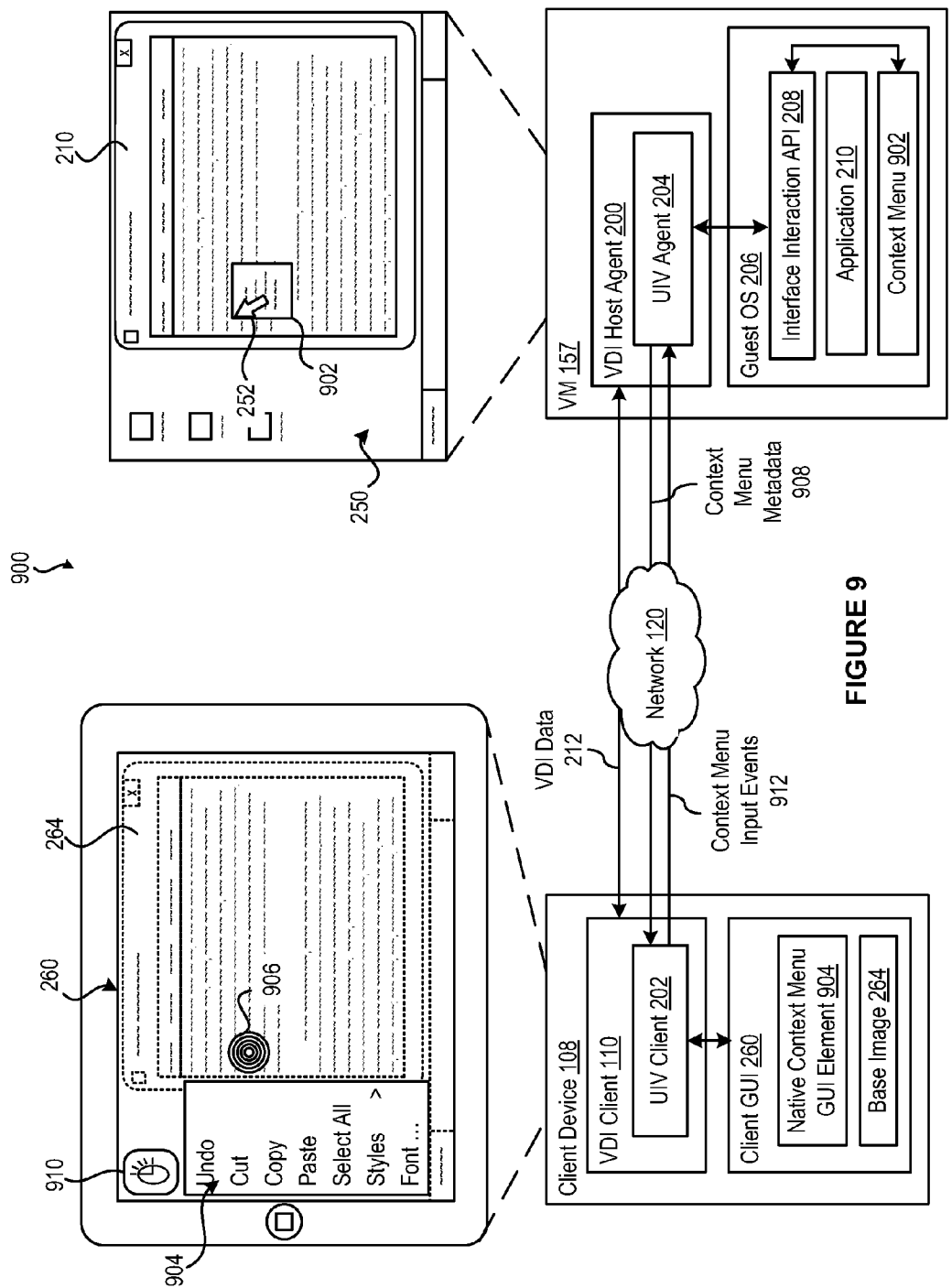
FIG. 9 illustrates components of a VDI system for providing access to a context menu GUI of a server device, according to one embodiment of the present disclosure.

FIG. 9 illustrates components of a VDI system 900 having a VDI client 110 that enables access to context menu GUI of a guest operating system 206 executing on VM 157 over network 120. VDI client 110 executing on client device 108 is configured to communicate with a VDI host agent 200 running in VM 157 to exchange VDI data 212 and provide access to a remote GUI (e.g., remote desktop 250) of VM 157.

In the embodiment of FIG. 9, guest OS 206 running on VM 157 includes a UI element, referred to as a context menu 902, that is a menu of options available in a current state or context of guest OS 206 or applications running on guest OS 206 (i.e., application 210). Context menu 902 may include a hierarchical menu of items and sub-menus of items made available based on a selected object or targeted region within the GUI of guest OS 206 for which the context menu is opened. Context menu 902 may have a traditional "point-and-click" style user interface that relies on input from a pointer (e.g., mouse cursor 252) may be difficult to navigate from a touch screen of client device 108. For example, in some embodiments, to open a context menu, a user may have to click a secondary mouse button (i.e., right-click) to open a context menu for the region that is under cursor 252. Simulating a right-click or opening a context menu in a specific region may be difficult to perform using touch input. Further, once open, context menu 902 may be organized into a nested menu of items and sub-menus that may be difficult to navigate using touch input.

According to an embodiment, VDI client 110 includes UIV client 202 configured to communicate with UIV agent 204 running on VM 157 to generate a native context menu GUI element 904 that is a virtual representation of context menu 902 at client device 108.

In one embodiment, VDI client 110 detects a UIV trigger performed by a user operating client device 108 to open a context menu 902 and activate corresponding native context menu GUI element 904. In some embodiments, VDI client 110 may cause a context menu 902 to be opened within a certain context within remote desktop 250 based on the location of a pre-determined touch input. For example, VDI client 110 may detect a gesture input (e.g., two-finger swipe left to right) or tap input (e.g., two-finger tap) performed by a user at a location within client GUI 260 and cause a context menu 902 to be opened in a corresponding location within remote desktop 250. FIG. 9 depicts a touch input 906 located within a window of application 210 that causes a context menu 902 to open within a corresponding location in remote desktop 250.

In other embodiments, VDI client 110 receives user input from a UI element 910 within client GUI 260 configured to open a context menu or simulate a secondary mouse button click (e.g., right-click). In some embodiments, VDI client 110 receives a first touch input on button 910 to activate native context menu GUI element 904 and a second touch input within client GUI 260 specifying a location or region to open context menu 902 in remote desktop 250. In some embodiments, VDI client 110 receives a single touch input on button 910 and simply causes a context menu to be opened at the current location of cursor 252 in remote desktop 250. While FIG. 9 depicts UI element 910 as a button having a right-click icon, it should be recognized that other forms of user interface elements may be used, including an on-screen "stub" UI element to slide out native context menu GUI element 904 from a hidden view off-screen.

In response to detecting the UIV trigger, UIV client 202 transmits to UIV agent 204 a request indicating native context menu GUI element 904 has been activated and requesting context menu metadata 908. In response to a request for context menu metadata 908, UIV agent 204 makes an API call to interface interaction API 208 exposed by guest OS 206 to obtain context menu metadata 908. Context menu metadata 908 includes information for a plurality of menu items within context menu 902, such as an item name (e.g., "Undo", "Cut", "Copy"); graphical icon, if any; and an item identifier that uniquely identifies the item within context menu. In cases where context menu 902 is a nested menu having one or more sub-menus, context menu metadata 908 may include information of every item in the nested menu, including the sub-menus, stored in a hierarchical format, or, alternatively, may include information for a limited number of levels of menu items (e.g., first level) and additional levels may be provided upon request from UIV client 202. As shown, UIV agent 204 transmits the generated context menu metadata 908 to UIV client 202 on client device 108.

In an alternative embodiment, rather than actively request context menu metadata 908, VDI client 110 may transmit an indication to open a context menu at a specified location within remote desktop 250, and UIV agent 204 reactively detects a context menu has been opened, obtains context menu metadata 908, and transmits context menu metadata 908 to UIV client 202.

UIV client 202 constructs and displays a native context menu GUI element 904 having the same functionality and information as a corresponding context menu 902 on the remote desktop based on the received context menu metadata 908. In some embodiments, native context menu GUI element 904 may be configured similarly to a native menu bar GUI element shown in FIG. 2. In one embodiment, native context menu GUI element 904 contains a plurality of items corresponding to the items within context menu 902, such as items "Undo", "Cut", "Copy", "Paste." As depicted in FIG. 9, the plurality of items may be rendered using enlarged fonts and icons to provide a touch-friendly manner of interfacing with a context menu 902. Native context menu GUI element 904 may include sub-menu items, such as the "Styles" item depicted in FIG. 9, which may be navigated to further levels of context menu items within native context menu GUI element 904. Native context menu GUI element may include menu items, such as the "Font . . . " menu item, which may cause additional dialog boxes to be opened. It should be recognized that additional dialog boxes or other UI elements launched as a result of user input on the native context menu GUI element may be further handled according to user interface virtualization techniques described herein.

As shown, native context menu GUI element 904 may be displayed on top of, or overlaid, on a base image 264 that is a graphical representative of remote desktop 250 on VM 157, although other methods for displaying native context menu GUI element 904 may be used, including rendering native context menu GUI element 904 as a side-panel callout arranged alongside base image 264 such that native context menu GUI element 904 displaces or scales base GUI image 264 temporarily.

UIV client 202 is configured to capture user input on native context menu GUI element 904 and transmit a context menu input event 912 to UIV agent 204 running in VM 157. In one embodiment, context menu input event 912 includes a reference that identifies a menu item within native context menu GUI element 904 and that corresponds to an item within context menu 902 (e.g., as specified by context menu metadata 908), and further includes an indication that the referenced menu item has been selected.

Responsive to receiving context menu input event 912, UIV agent 204 programmatically manipulates context menu 902 in the GUI of remote desktop 250 according to received context menu input event 912 using interface interaction API 208. In some embodiments, in response to receiving context menu input event 912 indicating menu navigation of context menu 902, UIV agent 204 makes an API call (e.g., via interface interaction API 208) to invoke at least one of the plurality of menu items within context menu 902 that is referenced by context menu input event 912. For example, UIV agent 204 may make an API call using interface interaction API to invoke the "Select All" menu item specified by context menu input event 912 and select all text in an application 210. As described earlier, in some cases, menu navigation of context menu 902 may involve navigation to multiple levels of menus. UIV agent 204 may determine a change in state of context menu 902, generate updated UI metadata specifying the change in state of the context menu using interface interaction API 208, and provide the updated UI metadata to UIV client 202.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of generating a local graphical user interface (GUI) on a touch screen of a client device that is connected to a server device having a remote desktop, the method comprising:
   receiving, from the server device, user interface (UI) metadata that specifies content of a context menu in the remote desktop, and a base image comprising a graphical representation of the remote desktop;
   generating, at the client device, a native context menu GUI element based on received UI metadata, wherein the native context menu GUI element comprises a virtual representation of the context menu of the remote desktop and operates in accordance with touch and gesture input functions native to the client device;
   generating a local GUI to be displayed on the touch screen of the client device, the local GUI comprising the base image received from the server device and the native context menu GUI element; and
   responsive to detecting that the native context menu GUI element has been manipulated through a touch or gesture input, transmitting, to the server device, an input event indicating a corresponding manipulation of the context menu in the remote desktop.

2. The method of claim 1, further comprising:
   responsive to detecting a gesture input associated with context menus at a location within the local GUI, transmitting, to the server device, an indication to open the context menu at a specified location in the remote desktop corresponding to the location in the local GUI.

3. The method of claim 1,
   wherein the UI metadata comprises semantic information related to contents of the context menu in the remote desktop, and
   wherein the UI metadata is organized in a tree-like data structure.

4. The method of claim 1, wherein the generated native context menu GUI element is different than the corresponding context menu in the remote desktop in at least one of size, shape, color, style, manner of interaction, animation, and interactive behavior.

5. The method of claim 1, wherein the local GUI comprises at least one of the native context menu GUI element arranged on top of the base image received from the server device, and the native context menu GUI element arranged in a side-panel alongside the base image received from the server device.

6. The method of claim 1, wherein the input event transmitted to the server device comprises event information configured to trigger an application programming interface of the server device to programmatically manipulate the context menu of the remote desktop.

7. The method of claim 1, wherein the context menu in the remote desktop is activated in response to a point-and-click type input and the native context menu GUI element is activated through the touch or gesture input.

8. The method of claim 7, wherein the context menu is a pop-up menu.

9. A method of providing access to a remote desktop of a server device having a guest operating system executing therein, the method comprising:
   generating user interface (UI) metadata specifying content of a context menu in a graphical user interface (GUI) of a remote desktop using an application programming interface of the guest operating system configured to programmatically manipulate the GUI of the server device;
   transmitting a base image of the GUI and the generated UI metadata to a touch input client device connected to the server device, the touch input client device having a native context menu GUI element that is a virtual representation of the context menu of the remote desktop and operates in accordance with touch and gesture input functions native to the client device;
   receiving, from the touch input client device, an input event relating to a touch or gesture navigation of the native context menu and indicating a corresponding menu navigation of the context menu in the GUI of the remote desktop; and
   programmatically manipulating the context menu in the GUI of the remote desktop according to the received input event using the application programming interface of the guest operating system.

10. The method of claim 9,
    wherein the context menu of the remote desktop comprises a plurality of items, and wherein programmatically manipulating the context menu further comprises:
invoking at least one of the plurality of items specified by the received input event using the application programming interface.

11. The method of claim 9, further comprising:
upon determining a change in state of the context menu in the GUI of the remote desktop, generating updated UI metadata specifying the change in state of the context menu using the application programming interface of the guest operating system configured to programmatically manipulate the GUI of the server device.

12. The method of claim 9, wherein the UI metadata comprises semantic information related to contents of the context menu and organized in a tree-like data structure.

13. The method of claim 9, wherein the application programming interface comprises an accessibility assistive application programming interface of the guest operating system configured to expose functionality of the GUI.

14. A non-transitory computer readable medium containing program instructions for generating a local graphical user interface (GUI) on a touch screen of a client device that is connected to a server device having a remote desktop, wherein execution of the program instructions by one or more processors of a computer system causes the one or more processors to carry out the steps of:
receiving, from the server device, user interface (UI) metadata that specifies content of a context menu in the remote desktop, and a base image comprising a graphical representation of the remote desktop;
generating, at the client device, a native context menu GUI element based on received UI metadata, wherein the native context menu GUI element comprises a virtual representation of the context menu of the remote desktop that operates in accordance with touch and gesture input functions native to the client device;
generating a local GUI to be displayed on the touch screen of the client device, the local GUI comprising the base image received from the server device and the native context menu GUI element; and
responsive to detecting that the native context menu GUI element has been manipulated through a touch input, transmitting, to the server device, an input event indicating a corresponding manipulation of the context menu in the remote desktop.

15. The non-transitory computer readable medium of claim 14, wherein the execution of the program instructions further causes the one or more processors to carry out the steps of:
responsive to detecting a gesture input associated with context menus at a location within the local GUI, transmitting, to the server device, an indication to open the context menu at a specified location in the remote desktop corresponding to the location in the local GUI.

16. The non-transitory computer readable medium of claim 14, wherein the UI metadata comprises semantic information related to contents of the context menu in the remote desktop, wherein the UI metadata is organized in a tree-like data structure.

17. A non-transitory computer readable medium containing program instructions for providing access to a remote desktop of a server device having a guest operating system executing therein, wherein execution of the program instructions by one or more processors of a computer system causes the one or more processors to carry out the steps of:
generating user interface (UI) metadata specifying content of a context menu in a graphical user interface (GUI) of a remote desktop using an application programming interface of the guest operating system configured to programmatically manipulate the GUI of the server device;
transmitting a base image of the GUI and the generated UI metadata to a touch input client device connected to the server device, the touch input client device having a native context menu GUI element that is a virtual representation of the context menu of the remote desktop and operates in accordance with touch and gesture input functions native to the client device;
receiving, from the touch input client device, an input event relating to a touch or gesture navigation of the native context menu and indicating a corresponding menu navigation of the context menu in the GUI of the remote desktop; and
programmatically manipulating the context menu in the GUI of the remote desktop according to the received input event using the application programming interface of the guest operating system.

18. The non-transitory computer readable medium of claim 17, wherein the context menu of the remote desktop comprises a plurality of items, and wherein programmatically manipulating the context menu further comprises:
invoking at least one of the plurality of items specified by the received input event using the application programming interface.

19. The non-transitory computer readable medium of claim 17, wherein the execution of the program instructions further causes the one or more processors to carry out the steps of:
upon determining a change in state of the context menu in the GUI of the remote desktop, generating updated UI metadata specifying the change in state of the context menu using the application programming interface of the guest operating system configured to programmatically manipulate the GUI of the server device.

20. The non-transitory computer readable medium of claim 17, wherein the UI metadata comprises semantic information related to contents of the context menu and organized in a tree-like data structure.

* * * * *